Oct. 14, 1930.                C. E. REED                 1,778,607
                           FIGURE INDICATOR
                   Filed Aug. 15, 1928      2 Sheets-Sheet 1
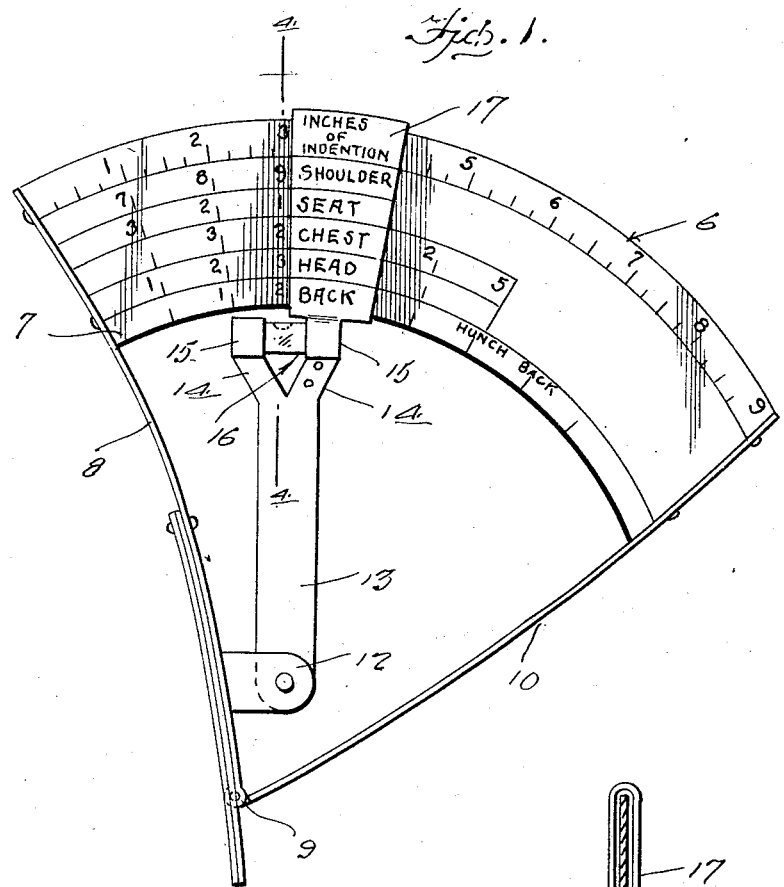
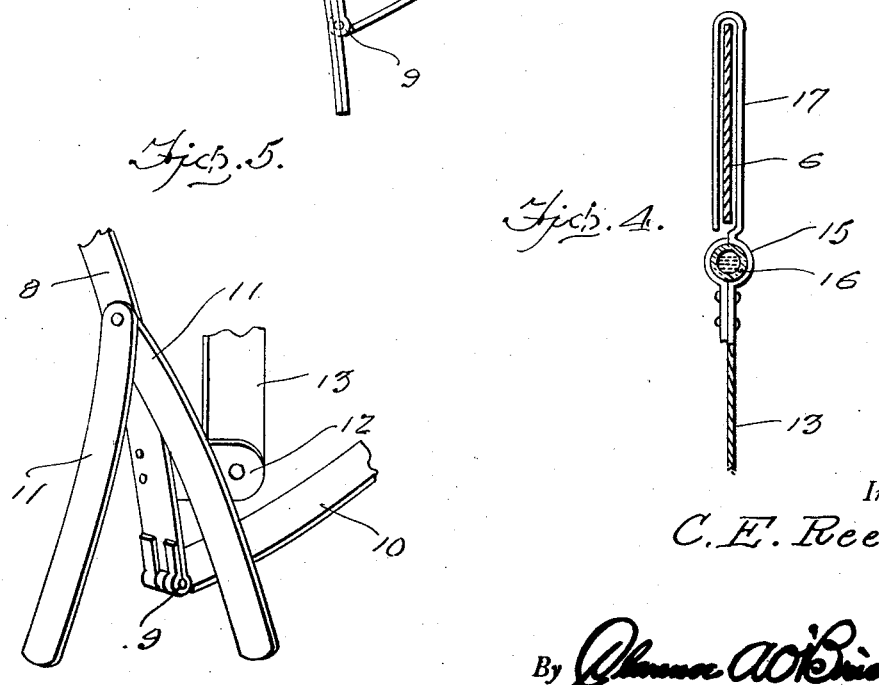
Inventor
C. E. Reed Oct. 14, 1930.  C. E. REED  1,778,607
FIGURE INDICATOR
Filed Aug. 15, 1928   2 Sheets-Sheet 2
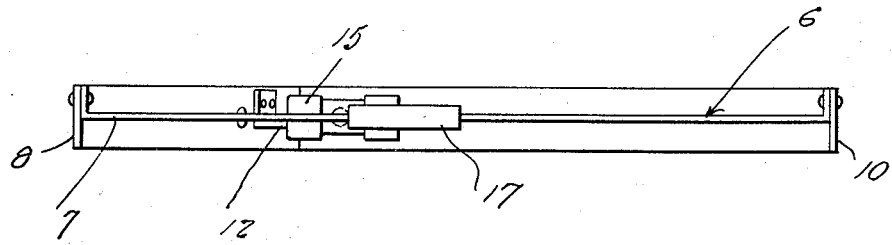
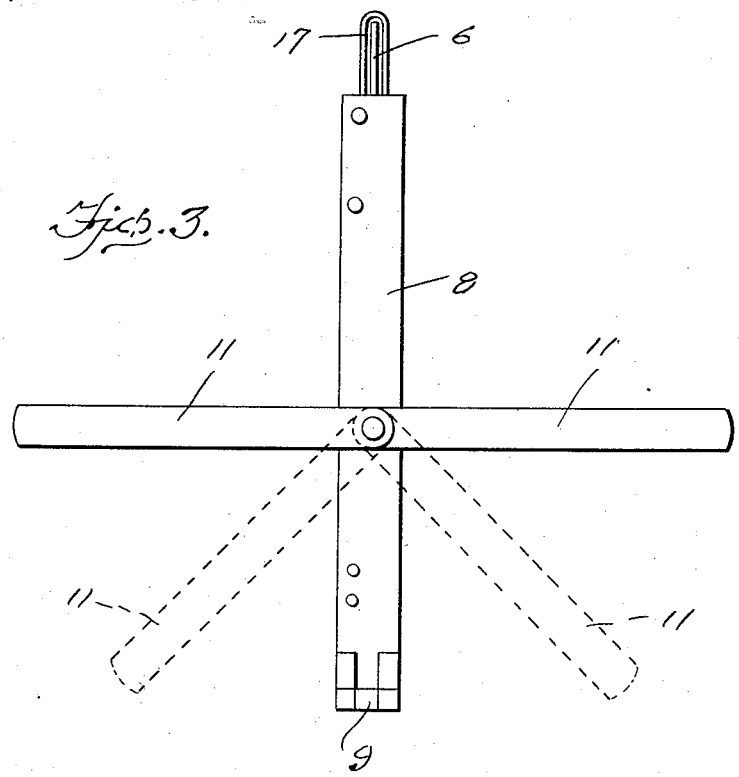
Inventor
C. E. Reed
By Clarence A. O'Brien
Attorney Patented Oct. 14, 1930

1,778,607

UNITED STATES PATENT OFFICE

CHARLES E. REED, OF LEXINGTON, MISSOURI

FIGURE INDICATOR

Application filed August 15, 1928. Serial No. 299,830.

The present invention has reference to the broad class of measuring instruments, and more specific reference to a species of this class, which may be more particularly defined as a figure indicator, the same being designed to simplify the method of securing accurate information concerning the posture and form of a person being measured for clothing.

The instrument is especially, but not necessarily designed for use by a tailor to determine the natural posture of a person being measured and fitted, whereby the tailor may ascertain with reasonable accuracy measurements of the shoulders, seat, chest, head, back, etc.

By way of introduction, it may be conveniently stated that the majority of present day tailors, pattern makers and the like, are provided with plaques showing the principal outstanding differences and bodily ills of various types of persons, likely to be encountered in their trade. The plaques embody, for example, a picture of a person whose stature is erect with a full chest and flat back, another one of a person characterized by a regular chest and a regular back, one having a stout form with a prominent stomach, etc.

The present invention is used in connection with a chart of the character stated, and it is especially constructed to permit it to better fulfill the requirements of an invention of this class, to render it practical, so that it is positive and dependable in performance, to make it inexpensive, and to otherwise construct it to provide a decided improvement in the art.

Other features and advantages of the invention will become more readily apparent from the following description and drawings.

In the drawings:

Figure 1 is a side elevational view of an indicator or measuring instrument constructed in accordance with the present invention.

Figure 2 is a top plan view of the same.

Figure 3 is a front elevation view looking in a direction from left to right in Figure 1.

Figure 4 is a vertical sectional view, taken approximately on the plane of the line 4—4 of Figure 1.

Figure 5 is a fragmentary perspective view, emphasizing certain of the details.

Referring now to the drawings by reference ordinals, it will be observed that the numeral 6 designates generally a scale, which in the present instance is of general arcuate configuration, and is formed on the visible side with individual calibrated areas 7, the indications of which are based upon the printed chart and order blank previously referred to. Fastened at one end of the scale is the longitudinally concaved bar 8. Hingedly connected to the lower end of this, at 9, is a complemental longitudinally convexed bar 10, which is fastened to the opposite end of the scale 6, thus forming somewhat of an irregular V-shaped device in general aspect. Pivotally mounted on the bar 8, above the hinge 9 are bracing fingers 11, of appropriate length and curvature. Also mounted on this bar and extending at right angles thereto is a bracket 12, upon which an arm 13 is pivotally mounted. As shown in Figure 1, the upper end of this arm is bifurcated, the furcations being indicated by the numeral 14. These furcations are formed into tubular retainers 15, for an ordinary spirit level 16. Carried by one of the members 15 is the indicator 17, which is in the form of a plate bent over the scale and slidable along the scale as is apparent from Figure 4. Incidentally, this indicator bears printed indicia, whose measurements in inches involving indentation, shoulder, seat, chest, etc. By "indentation" is meant the number of inches from the plumb line of the back over the nape of the neck.

Obviously the bar 8 tends to fit against the back, chest, seat and head. When applied to these portions in a vertical plane, the two fingers or wings 11 can be swung out to the desired angular position with respect to this bar, to form a better brace to steady the placement of the device. The bar 10 is adapted to be placed on top of the shoulders and when positioned thereon and the level is moved to a horizontal position will indicate the type of shoulder as shown by the aforementioned chart. The indicator will move back and forth along the scale, so that when the bead in the level is brought to a horizontal plane, the indicator will match the appropriate graduations or measurements on the scale.

In this connection it is essential to remember that most tailoring establishments and pattern makers are provided with printed order blanks and charts used in showing the various types of the different portions of the body of the average customer, for example of the chest, waist and back, three shoulder types, three seat types, etc., nine different examples. This accounts for the nine measurements on the long calibrated area at the top of the scale 6. The remainder of the measurements are based on the same chart, for properly using the device, the user being enabled to give more accurate instructions to the pattern maker. It is thought, however, that persons skilled in the art to which the invention relates will be able to obtain a clear understanding after considering the invention in conjunction with the drawings. Therefore, a more lengthy description is regarded unnecessary.

I claim:

1. A figure indicator of the class described comprising a scale in the form of a graduated flat arcuate plate, a pair of rigid bar members fastened to opposite ends of said scale and disposed in converging connected relation, one of said bar members being longitudinally concaved and the other of said bar members being longitudinally convex in configuration, an indicator pivotally mounted on one of the bar members and cooperable with said scale, together with a pair of bracing fingers pivotally mounted on said one bar member.

2. A figure indicator of the class described comprising a scale in the form of a graduated flat arcuate plate, a pair of rigid bar members fastened to opposite ends of said scale and disposed in converging connected relation, one of said bar members being longitudinally concaved and the other bar member being longitudinally convexed in configuration, an indicator pivotally mounted on one of the bar members and cooperable with said scale, together with a pair of bracing fingers pivotally mounted on said one bar member, said indicator comprising an arm, a spirit level carried by the arm, and means carried by the arm and slidably mounted along said scale and provided with indicia for cooperation with the graduation on the scale.

In testimony whereof I affix my signature.

CHARLES E. REED.